(12) United States Patent
Fitzgerald et al.

(10) Patent No.: US 6,257,524 B1
(45) Date of Patent: Jul. 10, 2001

(54) MECHANICAL DEREEFER

(75) Inventors: Adam Justin Fitzgerald, Vernon; Todd Grenga, Enfield, both of CT (US)

(73) Assignee: Capewell Components Company Limited Partnership, South Windsor, CT (US)

( * ) Notice: Subject to any disclaimer, the term of this patent is extended or adjusted under 35 U.S.C. 154(b) by 0 days.

(21) Appl. No.: 09/471,918

(22) Filed: Dec. 23, 1999

(51) Int. Cl.$^7$ .......................... B64D 17/00; B64D 17/58; B64D 17/14; B64D 17/30
(52) U.S. Cl. .......................... 244/142; 244/152; 244/150; 244/147; 244/151 B
(58) Field of Search .................................. 244/152, 150, 244/147, 151 B, 142

(56) References Cited

U.S. PATENT DOCUMENTS

| | | |
|---|---|---|
| 612,194 | 10/1898 | Clough . |
| 1,618,321 | 2/1927 | Woods . |
| 2,665,163 * | 1/1954 | Gross ..................................... 294/83 |
| 3,034,750 * | 5/1962 | Sieverts ................................ 244/150 |
| 4,249,765 | 2/1981 | Janssen ................................. 294/84 |
| 4,291,852 * | 9/1981 | Simmons ............................... 244/147 |
| 5,464,301 * | 11/1995 | Kramer .................................. 403/322 |
| 5,832,571 | 11/1998 | Kanamori ............................. 24/599.6 |
| 6,126,115 * | 10/2000 | Carrier et al. ..................... 244/158 R |

\* cited by examiner

*Primary Examiner*—Charles T. Jordan
*Assistant Examiner*—Christian M. Best
(74) *Attorney, Agent, or Firm*—Alix, Yale & Ristas, LLP

(57) ABSTRACT

A mechanical dereefer comprises a frame having a housing end with a joining wall and spaced plates extending from the joining wall to define a L shaped bifurcated end. A latch is mounted between the plates for pivotal movement between a capture position, wherein a reefing line end is held, and a release position, wherein the reefing line end is released. The latch is maintained in the capture position by engagement with a latch lock slidable through an aperture in the joining wall to a projected position. The latch lock is maintained against a bias in the projected position by the engagement of an elbow link and a trigger link each pivotally mounted within the frame housing end. The trigger link may be actuated out of engagement with the elbow link either manually or by a trigger device. Once the trigger link is actuated out of engagement with the elbow link, the lock link is moved by the bias out of the projected position, allowing the latch to pivot to the release position and the reefing line ends to be released.

13 Claims, 5 Drawing Sheets

MECHANICAL DEREEFER

BACKGROUND OF THE INVENTION

This invention relates generally to a device for selectively holding and releasing lines and more particular to a device for releasing reefing lines on parachute canopies or the like.

The use of parachutes, either for air dropping heavy payloads or decelerating high speed aircraft, requires the incorporation of suitable means to regulate the opening of the parachute canopy. If not regulated, deceleration of the payload caused by rapid parachute canopy opening is excessive, imposing potentially destructive forces on the attached payload. Additionally, for payloads delivered using multiple parachutes, the opening of each parachute must be controlled so that no single parachute interferes with, or "starves", the opening of the remaining parachutes. To control the opening rate of such parachute canopies, so-called reefing lines are employed, typically encircling the rim of the parachute canopy. The reefing line ends are held by a dereefing device and the reefing line is sized so that the parachute canopy cannot fully open as long as the reefing line ends are held. The dereefing devices are associated with timers or barometrically controlled devices, which after a given time or at a given altitude release the reefing line ends, enabling full opening of the parachute canopy. Multiple differently sized reefing lines may be used for each parachute canopy, with each reefing line released sequentially so that the canopy can be opened in controlled stages, allowing further control over payload deceleration.

When the canopy is opened it imposes a force on the reefing line which is transferred to the reefing device. In known dereefing devices, this force tends to hold or lock the parts of the device together. Thus, known dereefing devices must be capable of overcoming the locking force created by taut reefing lines to ensure release of the reefing line ends.

Dereefing devices can generally be classified into either destructive or nondestructive types. The destructive types include those using explosive charges or mechanically actuated blades to sever the reefing line. While destructive dereefing devices are less susceptible to reefing line loads, they do not allow reuse of the reefing line and/or the dereefing devices themselves. Nondestructive dereefing devices typically capture a reefing line end loop around a pin. The pin is releasably held within a yoke. The pin is withdrawn from the yoke to release the reefing line and loops. As previously discussed, this arrangement allows the taut reefing line to hold or lock the pin to the yoke.

SUMMARY OF THE INVENTION

The invention in a preferred form is a mechanical dereefer comprising a frame with a bifurcated end defined by spaced frame plates and an opposing housing end. The housing end includes a base and housing walls orthogonal to the base which define a frame cavity within. A latch, comprising a latch body and a latch arm angularly mounted to the latch body, is mounted between the spaced plates of the bifurcated end. The latch arm and latch body define a line receiving cavity. The latch mounting allows pivotal movement between a capture position and a release position. In the capture position, a reefing line end loop is captured around the arm and within the line receiving cavity and prevented from sliding off of the arm by cooperation of the arm and frame. In the release position, the tension imposed by the taut reefing line pulls the reefing line end loop off of the arm. Preferably, the latch comprises a pair of opposing latch arms symmetrically mounted to the latch body to create a respective pair of the line receiving cavities. In this manner two reefing line end loops may be accommodated by a single inventive mechanical dereefer.

An elongated latch lock has an internal end located within the frame cavity and an opposing external end which is slidable between projected and withdrawn positions through an opening in a first housing wall. The latch lock is biased toward the withdrawn position by a tension member mounted between the latch lock interior end and a frame wall. In the projected position, the latch lock external end abuts a latch body shoulder to maintain the latch in the capture position. In the withdrawn position, the latch lock exterior end is displaced from the latch shoulder, so that the latch is free to pivot to the release position.

An elbow link is pivotally mounted within the frame cavity. The elbow link includes a first arm defining an elongated slot which mounts to the latch lock. The elbow link includes a second arm angularly offset from the first arm which terminates in a sear end. Preferably the sear end comprises a bi-leveled tip. The elbow link pivotal mounting is in the general location of the intersection of the first and second arms.

A trigger link is also pivotally mounted within the frame cavity. The trigger link includes a trigger end, engageable with the elbow link sear end, and an actuation end, which is movable within an aperture defined by a second housing wall.

In use of a preferred embodiment, a loop of the reefing line is placed around each latch arm and the latch is pivoted to the capture position. The elbow link is pivoted so that the latch lock exterior end engages the latch shoulder and the trigger link is actuated so that the trigger end engages the elbow link sear end. With the trigger and elbow link thus engaged, the latch lock is maintained in a semi-stable condition in contact with the latch shoulder, holding the reefing line ends secured. When release of the reefing line ends is desired, the trigger lever is actuated so that the trigger end is disengaged from the elbow link sear end, allowing the latch lock to be biased toward the withdrawn position. Once the latch lock exterior end is away from the latch shoulder, the latch is free to pivot under the tension imposed by the reefing lines to the release position, allowing the reefing lines to pull free of the latch arms. The use of a pivotal latch allows any force imposed by a taut reefing line to be used to actuate the latch, in contrast to conventional designs which are bound up by such reefing line force.

An object of the invention is to provide a new and improved mechanical dereefing device.

Another object of the invention is to provide a nondestructive dereefing device which utilizes loads imposed by taut reefing lines to aid activation.

A further object of the invention is to provide a mechanical dereefing device which can be quickly and easily reset for reuse.

BRIEF DESCRIPTION OF THE DRAWINGS

Other objects and advantages of the invention will be evident to one of ordinary skill in the art from the following detailed description made with reference to the accompanying drawings, in which.

DESCRIPTION OF THE PREFERRED EMBODIMENT

Figure 1:
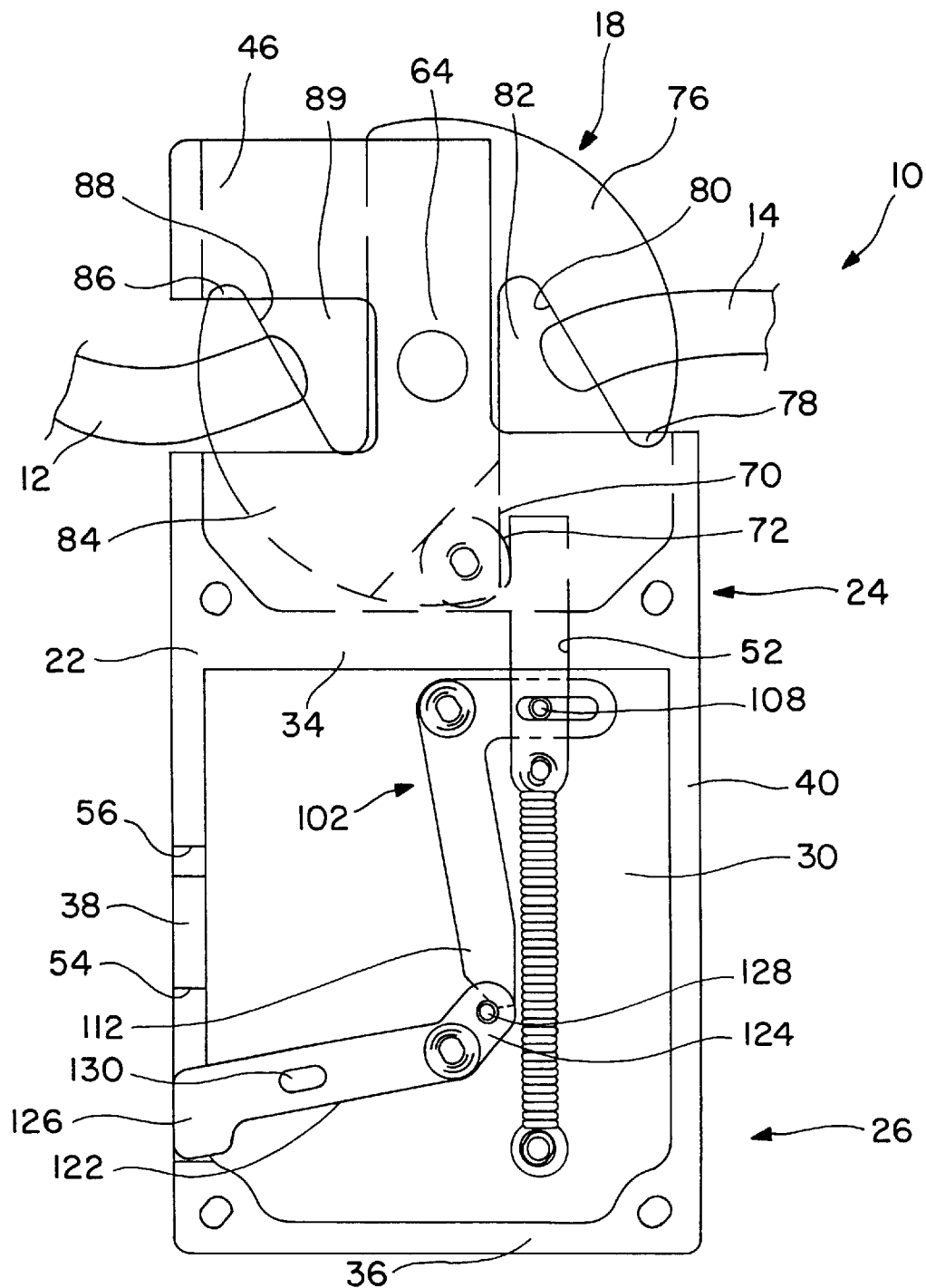
FIG. 1 is a bottom plan view, with the frame base removed and partly in phantom, of an embodiment of the mechanical dereefer with the latch maintained in the capture position.

With reference to the drawings wherein like numerals represent like parts, a mechanical dereefer is generally designated by the numeral 10. A preferred application for the inventive device is as a mechanical dereefer for a parachute canopy (not shown). In this application, a reefing line encircles a parachute canopy, typically at the rim, with the ends of the reefing line terminating in loops 12, 14 which are secured to the dereefer 10. When the canopy is deployed, the reefing line prevents the canopy from opening to its full diameter, controlling deceleration forces imposed by the parachute and allowing multiple parachutes, if present, to open to the reefed state without starving one another. Typically, the dereefing device 10 is triggered by a device 16 such as a timer or barometric pressure mechanism. These trigger devices 16 are conventional and are not part of the invention. When the mechanical dereefer 10 is triggered, the latch 18 is free to pivot so that the reefing line loops 12, 14 can be pulled free of the latch 18 by the tension imposed on the reefing line from the canopy. Once the reefing line loops are freed, the parachute canopy can expand to its fully open diameter.

Figure 2:
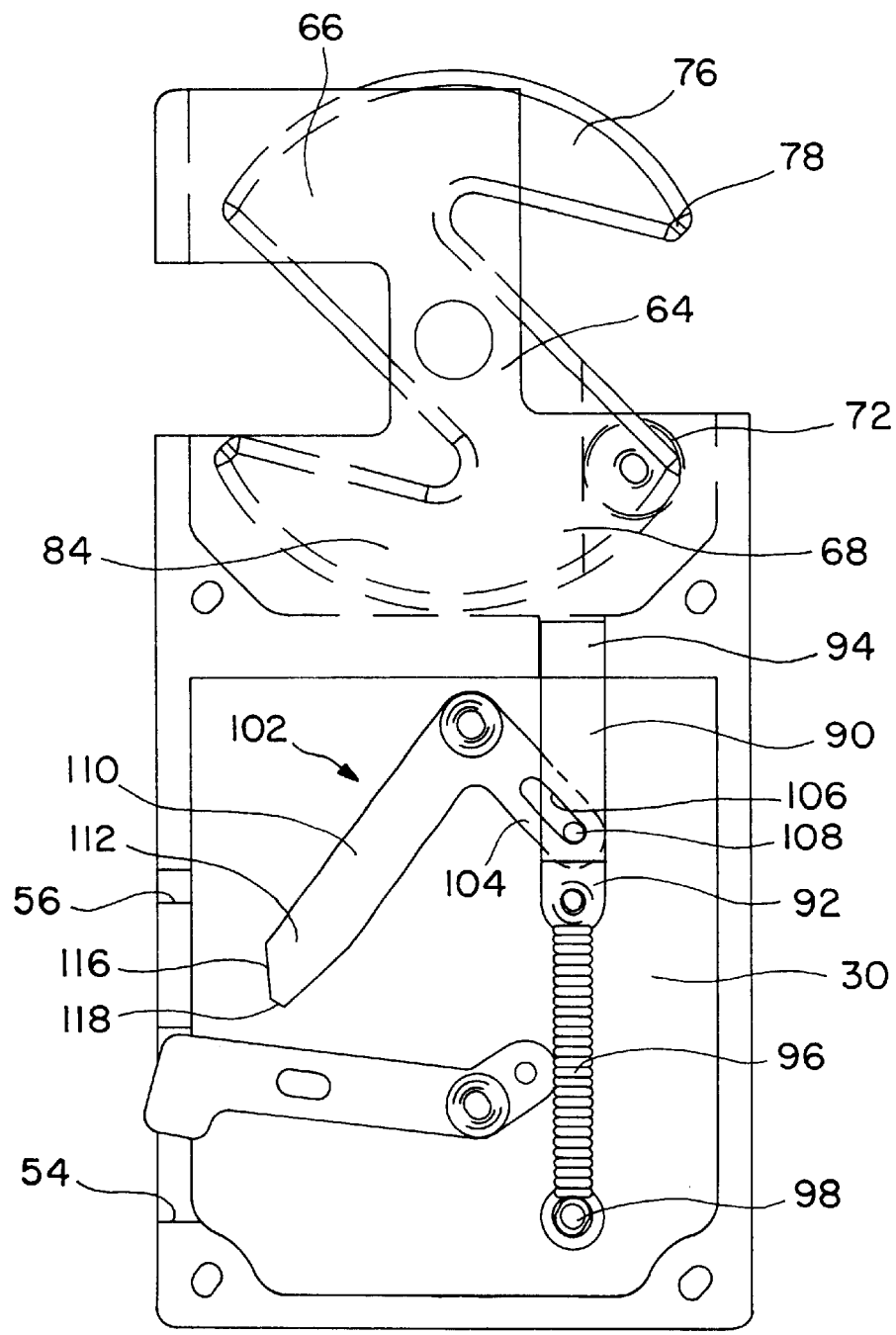
FIG. 2 is a view similar to FIG. 1 with the latch in the release position.
Figure 3:
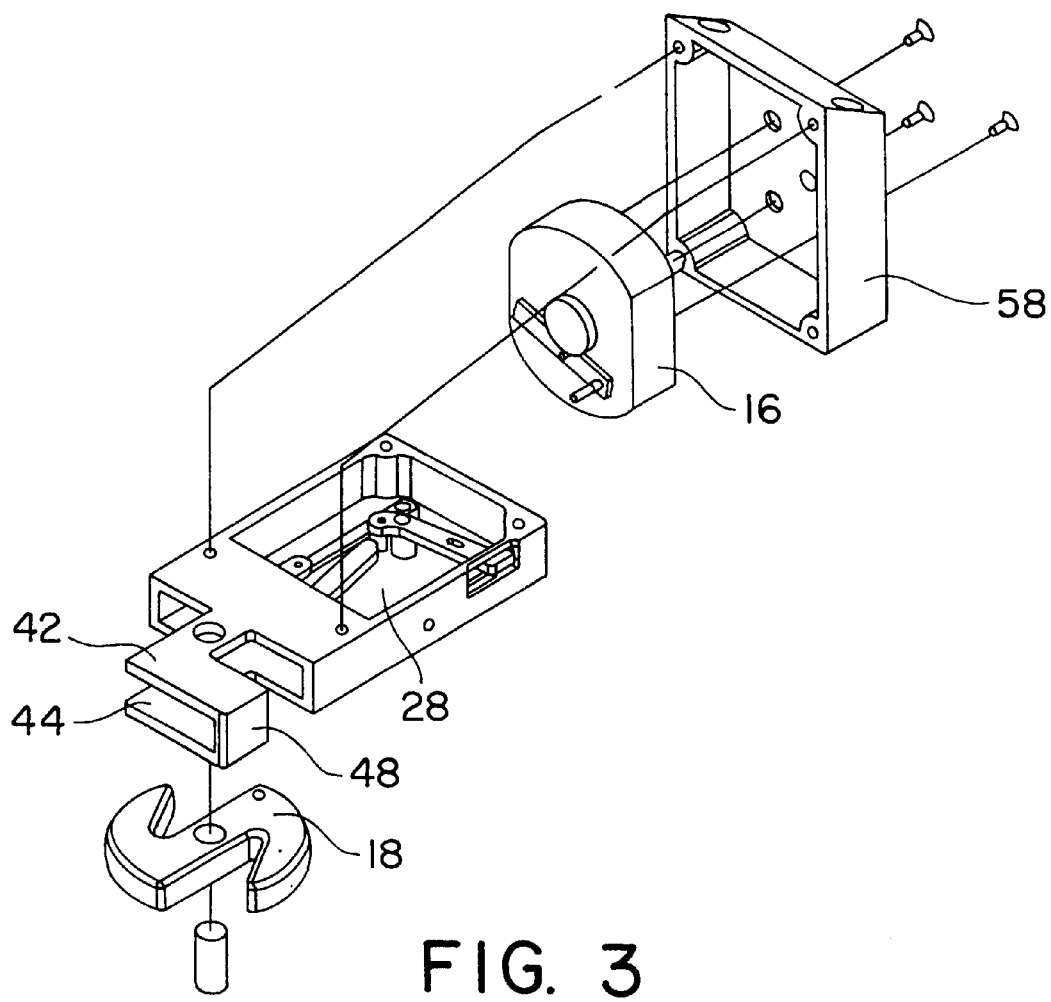
FIG. 3 is a perspective, partially exploded view of a dereefer including a trigger device and cover.
Figure 4:
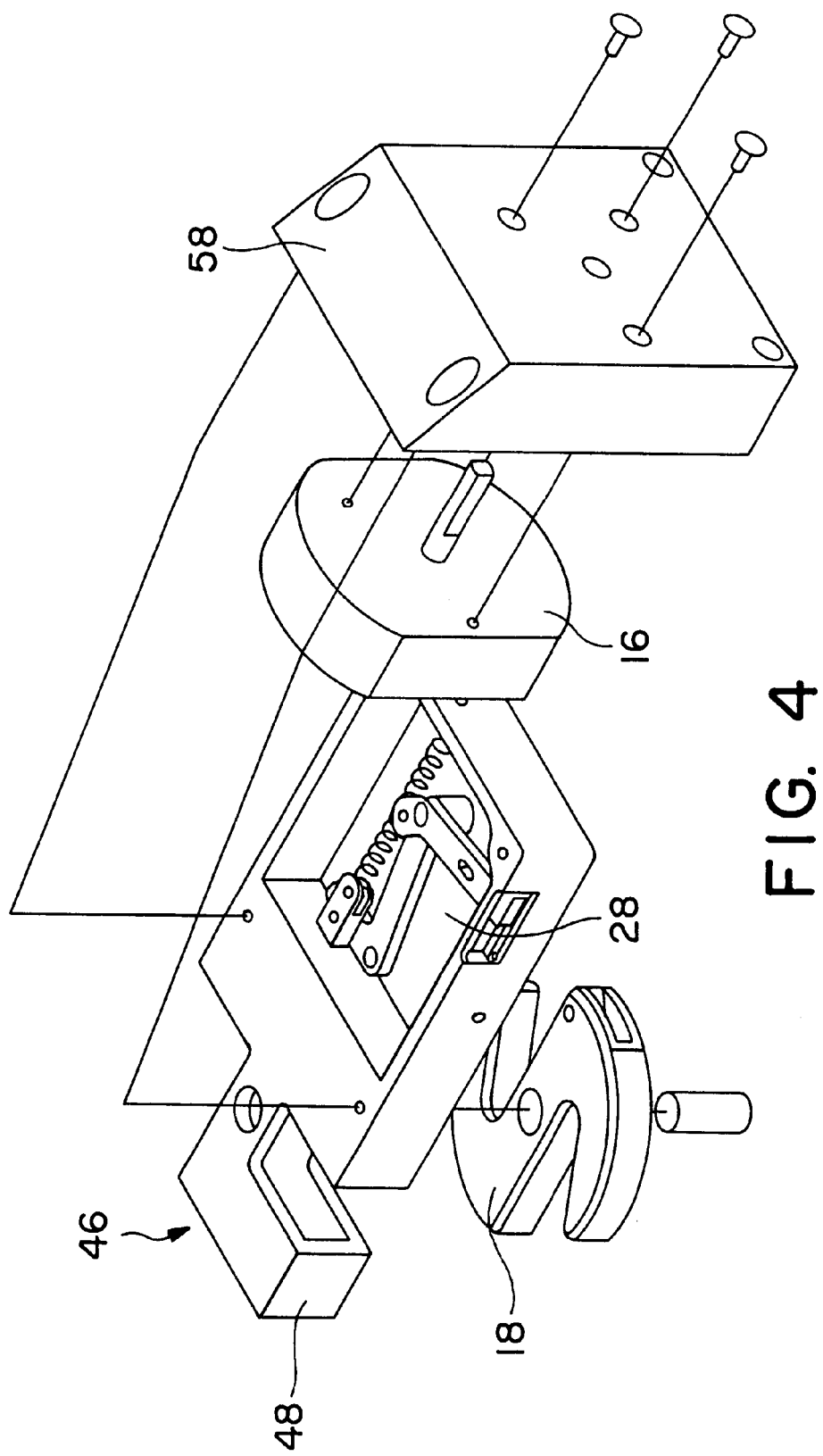
FIG. 4 is a perspective, partially exploded view of a dereefer from a different angle than FIG. 3.
Figure 5:
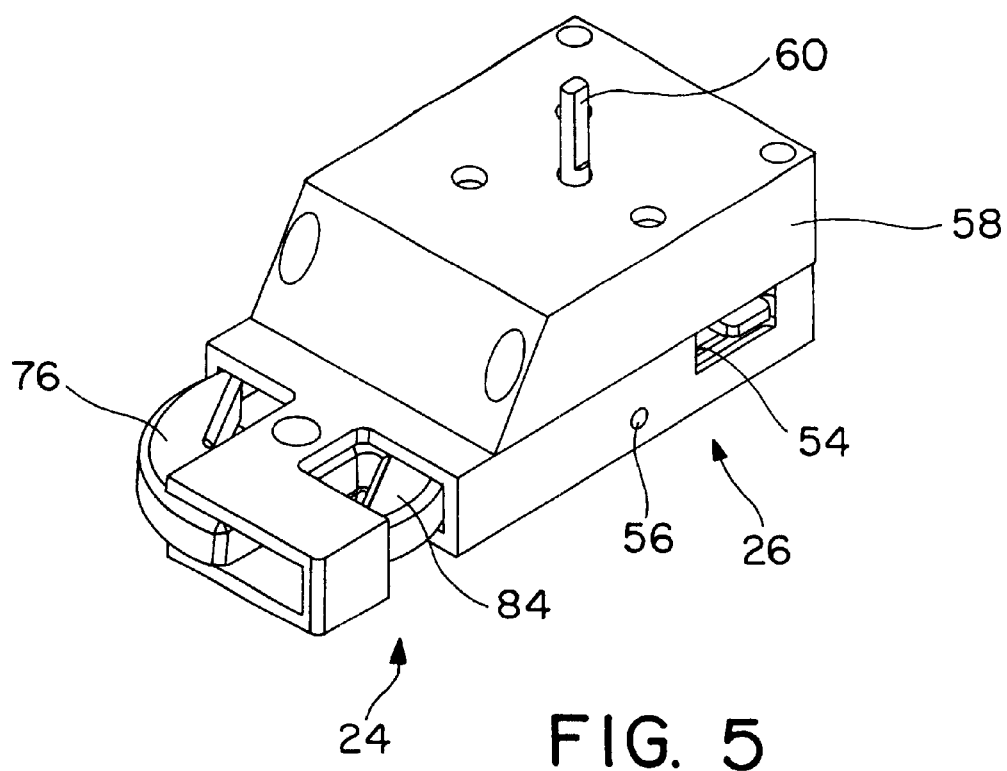
FIG. 5 is a perspective view of an assembled dereefer.

With reference to FIGS. 1 and 2, the mechanical dereefer 10 in a preferred form comprises a frame 22 with a bifurcated portion 24 and an opposing housing portion 26. The housing portion 26 includes walls orthogonally projecting from a base 28 (shown best in FIG. 4) to define a frame cavity 30 therein. The walls can be defined as a joining wall 34, an opposing end wall 36 and a pair of spaced side walls 38,40. Spaced frame plates 42,44 (shown best in FIG. 3) extend from the joining wall 34 parallel with the housing base 28 to create the bifurcated portion 24. Preferably, the bifurcated portion terminates in an L-shaped configuration or extension 46 so that two reefing line end loops 12, 14 may be accommodated as later described. The ends of the L-shaped extension 46 may be joined by a section 48 (shown best in FIG. 4) to increase the strength of the bifurcated end. The joining wall 34 also defines an aperture 52 therethrough between frame plates 42, 44. A trigger link aperture 54 and a tool access aperture 56 are defined in at least one side wall 38. A cover 58 (shown best in FIG. 3) is mountable to the frame 22 over the frame cavity 30, with a trigger device 16 mountable to or within the cover 58. Preferably, when the cover 58 is mounted to the frame 22, the trigger device 16 and mechanism contained within the frame cavity 30 are substantially enclosed for protection. A shaft 60 of the trigger device 16 may penetrate the cover 58 as shown in FIG. 5 to allow, for example, setting of the trigger device.

A latch 18 comprising a latch body 64 with opposing ends 66,68 is mounted between the frame plates 42,44 for pivotal movement therein between a capture position, shown in FIG. 1, and a release position, shown in FIG. 2. The latch body 64 is mounted intermediate the ends 66,68. At least one end of the latch body 64 comprises a shoulder 70. Preferably, the latch shoulder 70 further comprises a rotatably mounted anti-friction roller 72. A latch arm 76 is mounted at an end thereof to a latch body end 66 to extend angularly therefrom, terminating in a latch arm tip 78. The latch arm 76 has a line engagement face 80 opposing the latch body 64 with a line receiving cavity 82 defined therebetween. The line engagement face 80 may be tapered or beveled along its length to prevent damage to the reefing line loops 12, 14 and to allow the loops to more freely slide off the latch arm 76. In the preferred embodiment, each latch body end 66,68 includes a generally symmetrical latch arm 76,84 each having a line engagement face 80,88. The resulting latch has an "S" shape defining two line receiving cavities 82,89. Each latch arm 76,84 includes a tip 78,86 which is housed between the spaced frame plates 42,44 in the capture position. The latch 18, including latch body 64 and latch arms 76, 84, is preferably manufactured as a unitary item.

An elongated latch lock 90 comprises an interior end 92 positioned within the frame cavity 30 and an exterior end 94 projectable through the joining wall aperture 52. In a projected position (shown in FIG. 1), the latch lock 90 engages the latch shoulder 70 or roller 72 to prevent pivotal movement of the latch 18 from the capture position. A tension member 96 within the frame cavity 30 is mounted to the latch lock adjacent the interior end 92 and to an anchor 98 within the frame cavity 30. The tension member 96 imposes a tension bias on the latch lock 90 such that the latch lock is drawn toward the end wall 36 to a withdrawn position (shown in FIG. 2).

With reference to FIG. 2, an elbow link 102 is pivotally mounted to the housing base 28 within the frame cavity 30. A first arm 104 of the elbow link 102 defines an elongated slot 106 substantially following the longitudinal axis of the first arm 104. A pin 108 mounted to the latch lock 90 intermediate the ends 92,94 but toward the interior end 92 is slidably engaged within the slot 106. A bushing or other anti-friction device (not shown) may be disposed coaxially around the pin 108. A second arm 110 is angularly arranged with respect to the first arm 104 and the elbow link 102 is pivotally mounted at the general intersection of the first 104 and second 110 arms. The free end of the second arm 110 terminates in a sear end 112, preferably comprising a bi-beveled tip. The bi-beveled tip includes a locking face 116 obliquely angled with respect to the longitudinal axis of the elbow link second arm 110. The locking face 116 terminates at an intersecting release face 118 which is substantially perpendicular to the longitudinal axis of the second arm.

With reference to FIG. 1, a trigger link 122, spaced from the elbow link 102, is pivotally mounted to the housing base 28 within the frame cavity 30. The pivotal axis defined by the trigger link mounting is preferably substantially parallel to a pivotal axis defined by the elbow link mounting. The trigger link 122 comprises a trigger end 124 and an opposing actuation end 126, which is preferably angularly arranged with respect to the trigger end 124. The actuation end 126 is captured within the trigger link aperture 54 in the side wall 38 so that the pivotal movement of the trigger link 122 is limited thereby. The trigger link actuation end 126 is configured to permit ready manipulation of the trigger link 122 in the trigger link aperture 54. The actuation end may include tactile enhancing mechanisms such as serrations or checkering. The trigger end 124 mounts a shoulder 128 extending substantially parallel to the trigger link pivotal axis. Preferably the trigger link shoulder 128 is cylindrical in form. The preferred cylindrical configuration of the trigger link shoulder 128 allows line contact of the shoulder 128 with the locking face 116, reducing friction of the engaging parts and thereby the force required to pivot the trigger link 122. A bushing or other anti-friction device (not shown) may be disposed coaxially around the shoulder 128. The trigger link 122 includes an engagement aperture 130 between the actuation end 126 and the pivotal axis for engagement with a trigger device 16. While preferred embodiments for the elbow and trigger links have been described in detail, it should be realized that these links may have a variety of configurations while still achieving the same results. The invention encompasses such other link configurations.

When the latch lock 90 is moved against the tension member bias to the projected position the elbow link 102 is pivoted so that the trigger link shoulder 128 is engagable with the locking face 116 of the sear end 112. In the engaged condition, the bias force of tension member 96, transferred through the oblique angle of locking face 116, cooperates with shoulder 128 to force the trigger link actuation end 126 against an end of the trigger link aperture as shown in FIG. 1, so that further trigger link pivotal movement in that direction is prevented. Thus, engagement of the shoulder 128 with the locking face 116 is secure and maintains the latch lock 90 in the projected position and thereby the latch 18 in the capture position.

Movement of the trigger link 122 away from the trigger link aperture end pivots the shoulder 128 along the locking face 116, against the bias imposed by the tension member 96 on the locking face 116 to the release face 118. The perpendicular orientation of the elbow link release face 118 with respect to the elbow link second arm 110 allows a slight motion of the trigger link 122 beyond the intersection of the bi-beveled tip faces 116, 118 to move the shoulder 128 out of engagement with the locking face 116 and further allows clearance for the elbow link 102 to pivot freely under the influence of the tension member 96.

In use of the preferred embodiment, the reefing line loops 12, 14 are each placed around one latch arm 76,84 and received within one line receiving cavities 82,89. The latch 18 is pivoted or rotated to the capture position, wherein the reefing line loops 12, 14 are held by the latch arms 76,86 and prevented from sliding off the respective latch arm by cooperation of the latch tips 78,86 and frame plates 42,44 as shown in FIG. 1. A tool, such as a screwdriver, is inserted through the tool access aperture 56 in the side wall 38 to bear against the elbow link second arm 110. Pressure against the elbow link second arm 110 with the tool will pivot the elbow link second arm 110 toward the tension member 96, moving the latch lock 90 to the projected position to thereby maintain the latch 18 in the capture position. Manual actuation of the trigger link actuation end 126 toward the trigger link aperture end engages the trigger link shoulder 128 with the bi-beveled tip locking face 116. Once the trigger link 122 and elbow link 102 are engaged, the latch 18 is in a semi-stable condition and the mechanical dereefer 10 is ready for use. It should be noted that even with the cover 58 in place, the mechanical dereefer 10 may be set and/or actuated via manipulation of the trigger link actuation end 126 within the trigger link aperture 54 and manipulation of the elbow link 102 by a tool inserted through the tool access aperture 56.

Manual actuation of the trigger link actuation end 126 away from the end of the trigger link aperture allows the trigger shoulder 128 to pivot oppositely in a direction away from the locking face 116. As the shoulder 128 moves past the intersection of the sear end faces 116, 118, the elbow link 102 is free to pivot allowing the tension member 96 to retract the latch lock 90. In this condition, tension imposed on either or both of the reefing line end loops 12, 14 will be transferred to the respective latch arms 76,84, thereby pivoting the latch arm tips 78,86 away from the frame plates 42,44. Once the latch arm tips 78,86 are clear of the frame plates 42, 44, tension on the reefing line pulls the reefing line end loops 12, 14 clear of the arms 76,84. The use of a friction reducing roller 72 at the latch shoulder 70 reduces the force needed to move the latch lock 90 out of engagement with the latch 18, further reducing any potential influence of the reefing line imposed forces on the inventive mechanical dereefer.

Alternatively, a trigger device 16, which may incorporate a timer, barometric pressure or other type of delay mechanism, can engage the trigger link engagement aperture 130. In similar fashion to the above described sequence of events, the triggering device 16 will pivot the trigger link actuation end 126, moving the trigger shoulder 128 out of engagement with the locking face 116 and thereby allowing movement of the elbow link 102, latch lock 90, latch 18 and subsequently release of the reefing line loops 12, 14.

As previously discussed, conventional dereefing devices tend to be bound up or locked by the tensions imposed on them from taut reefing lines. It should be noted that the inventive mechanical dereefer utilizes the same tension forces imposed by the opening parachute canopy through the reefing lines to actuate the latch, thereby constructively utilizing the reefing line loads.

While the preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A reefing device for selectively holding a line, comprising: a frame comprising a planar housing base, a joining wall extending orthogonally from said housing base, a first plate and a second plate spaced from said first plate each extending from said joining wall to define a bifurcated end, latch means mounted between both said plates and pivotally mounted to one said plate for movement in a plane substantially parallel with said plate between capture and release positions; and blocking means for selectively maintaining said latch means in the capture position, wherein said frame and latch means cooperate to hold said line in said capture position and release said line in said release position.

2. The reefing device of claim 1 wherein said bifurcated end is parallel with said housing base and comprises an L shaped portion with the plates joined at a free end.

3. A reefing device for selectively holding a line, comprising:

a frame comprising a first plate and a joining wall defining an aperture therethrough;

latch means pivotally mounted to said plate for movement in a plane substantially parallel with said plate between capture and release positions; and blocking means for selectively maintaining said latch means in the capture position, said blocking means comprising an elongated latch lock with an exterior end slidable through said joining wall aperture for movement between a projected position wherein said exterior end is engageable with said latch means and a withdrawn position wherein said latch means is free of said exterior end, wherein said frame and latch means cooperate to hold said line in said capture position and release said line in said release position.

4. A reefing device for selectively holding a line, comprising:

a frame comprising a first plate;

latch means pivotally mounted to said plate for movement in a plane substantially parallel with said plate between capture and release positions; and blocking means comprising a first link pivotally mounted to said frame with a sear end, and a trigger link pivotally mounted to said frame with a trigger end engageable with said sear end and an opposing actuation end, said blocking means for selectively maintaining said latch means in the capture position, wherein said frame and latch means cooperate to hold said line in said capture position and release said line in said release position.

5. The reefing device of claim 1 wherein said latch means, said first link and said trigger link all define parallel pivot axes.

6. The reefing device of claim 1 wherein said blocking means further comprises a latch lock including an interior end and an opposing exterior end with a pin mounted intermediate said latch lock ends; and said first link comprises a first end defining an elongated aperture for receiving said pin for sliding movement therein.

7. A reefing device for selectively holding a line, comprising:

a frame comprising a first plate;

latch means pivotally mounted to said plate for movement in a plane substantially parallel with said plate between capture and release positions; and blocking means comprising a first link pivotally mounted to said frame with a sear end having a bi-beveled tip portion with a locking face, and a trigger link pivotally mounted at a pivot axis to said frame with a trigger end comprising a shoulder parallel to said trigger link axis and engageable with said locking face, said blocking means for selectively maintaining said latch means in the capture position, wherein said frame and latch means cooperate to hold said line in said capture position and release said line in said release position.

8. A reefing device for selectively holding a line, comprising:

a frame comprising a first plate;

latch means pivotally mounted to said plate for movement in a plane substantially parallel with said plate between capture and release positions; and blocking means comprising an elbow link with a first arm including a first end, a second arm including a sear end angularly offset from said first arm, and a pivotal mounting to said frame generally at the intersection of said arms, said blocking means for selectively maintaining said latch means in the capture position, wherein said frame and latch means cooperate to hold said line in said capture position and release said line in said release position.

9. A reefing device for selectively releasing a line, comprising:

a frame with a bifurcated portion comprising spaced frame plates and an opposing housing portion, said housing portion comprising a housing base and a plurality of frame walls orthogonally projecting from said base to define a frame cavity therein;

a latch comprising a latch body and a latch arm angularly mounted to said latch body, said latch mounted between said spaced plates for pivotal movement between a capture position wherein said bifurcated portion and said arm cooperate to prevent said line from sliding off said arm and a release position wherein the line is releasable from said arm;

an elongated latch lock with an interior end located within said frame cavity and an exterior end slidable between a projected position between said spaced plates for engagement with said latch to maintain said latch in said capture position and a withdrawn position removed from engagement with said latch;

an elbow link pivotally mounted within said frame cavity with a first end movably attached to said latch lock and a sear end;

a trigger link pivotally mounted within said frame cavity with a trigger end engageable with said sear end and an actuation end, said actuation end movably trapped within an aperture defined in a frame wall.

10. The reefing device of claim 5 wherein said latch lock is maintained in said projected position when said trigger end is engaged with said sear end.

11. The reefing device of claim 5 wherein one said frame wall is a joining wall and said spaced frame plates are fixed to said joining wall, said joining wall defining an aperture therethrough and said latch lock is linearly movable within said joining wall aperture.

12. The reefing device of claim 5 wherein said latch lock interior end is mounted to a tension bias member which biases said latch lock toward said withdrawn position.

13. The reefing device of claim 7 wherein said elbow link first end defines an elongated aperture; a pin is mounted intermediate said latch lock interior and exterior ends and said pin is captured within said elbow link elongated aperture for sliding movement therein.

* * * * *